UNITED STATES PATENT OFFICE.

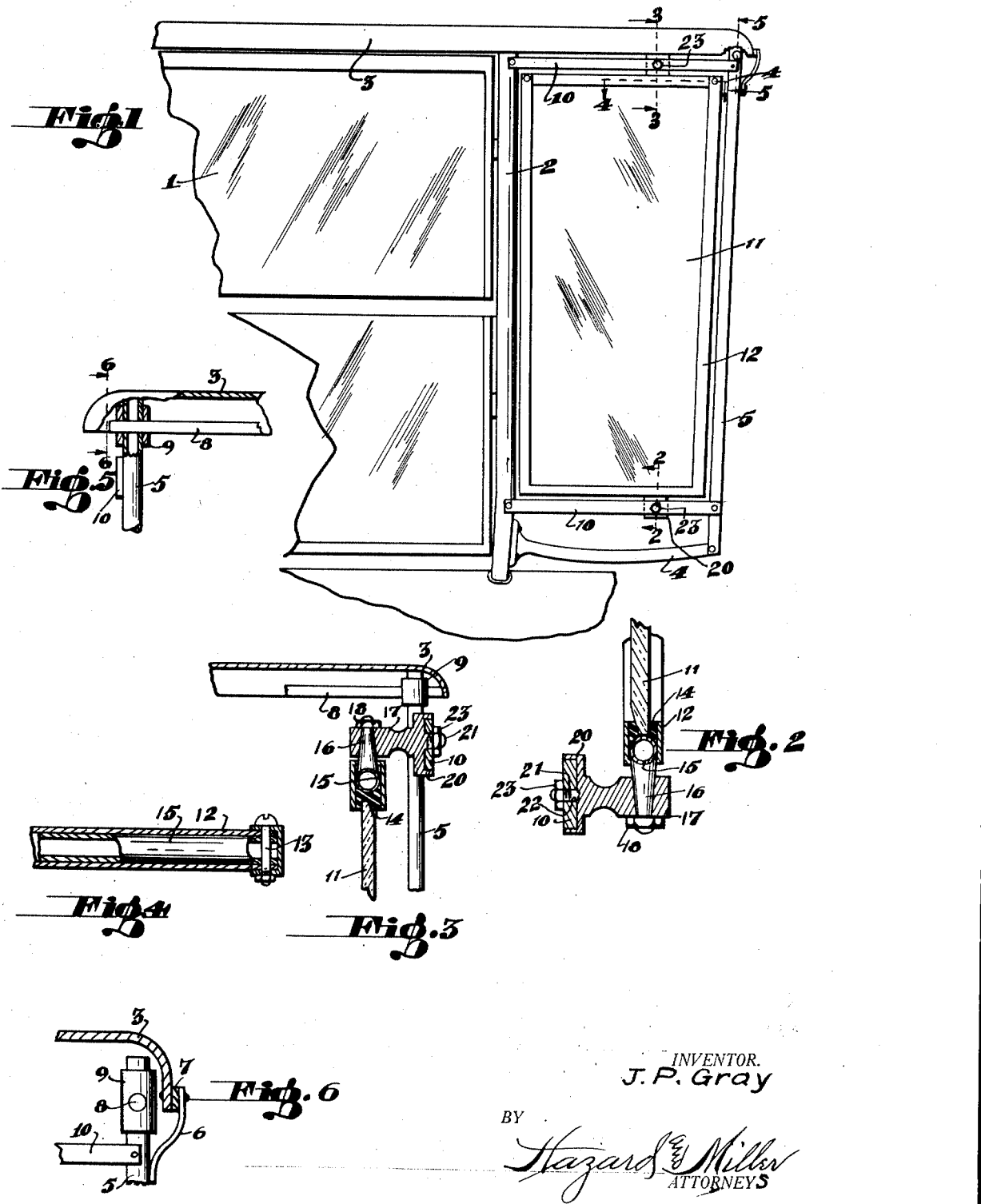

JOSEPH P. GRAY, OF LOS ANGELES, CALIFORNIA.

WIND DEFLECTOR.

1,415,836.   Specification of Letters Patent.   Patented May 9, 1922.

Application filed June 11, 1920. Serial No. 388,161.

*To all whom it may concern:*

Be it known that I, JOSEPH P. GRAY, a citizen of the United States, residing at Los Angeles, in the county of Los Angeles and State of California, have invented new and useful Improvements in Wind Deflectors, of which the following is a specification.

This invention relates to wind deflectors adapted to be mounted at the sides of the usual windshield of motor vehicles.

It is the object of the invention to provide an improved mounting for a wind deflector of this character which will rigidly support the wind deflector and prevent vibration and rattling thereof and which will also provide means for pivotally adjusting the angular relation of the wind deflector with relation to the main windshield.

The invention will be readily understood from the following description of the accompanying drawings, in which—

Figure 1 is a front elevation of a portion of the windshield of a motor vehicle showing one of the improved wind deflectors mounted at one side of said main windshield.

Fig. 2 is a fragmentary detail section on the line 2—2 of Fig. 1.

Fig. 3 is a similar section on the line 3—3 of Fig. 1.

Fig. 4 is a detail section on the line 4—4 of Fig. 1.

Fig. 5 is a detail section on the line 5—5 of Fig. 1.

Fig. 6 is a section on the line 6—6 of Fig. 5.

In the drawings I have shown a usual windshield 1 mounted between side uprights 2 with the top 3 of the motor vehicle extending over the edge of the windshield and projecting laterally beyond the sides thereof for an appreciable distance. A supporting frame for the wind deflector to be mounted upon the side upright 2 is positioned in the space along side said side upright and beneath the lateral extension of the top 3. This supporting frame is shown as comprising a lower supporting rod 4 extending laterally from upright 2 and an upright 5 secured to the outer end of rod 4 and extending upwardly therefrom to a point beneath the edge of the top 3. The upper end of upright 5 is, preferably, connected to the edge of top 3 as by a bracket 6 secured to a molding 7 provided along the outer edge of the top. A rod 8, preferably, extends lengthwise of top 3 beneath the edge thereof and said rod is, preferably, connected to upright 5 as by a union 9.

Cross bars 10 connect uprights 2 and 5 adjacent the respective ends thereof, and the improved wind deflector is pivotally mounted at its respective ends upon these cross bars. The wind deflector is shown as comprising a plate of transparent material preferably glass as shown at 11. This plate is received within a frame which may be formed of channel strips 12, the ends of said strips at the corners of the frame overlapping and being suitably bolted together as shown at 13 in Fig. 4. The edges of plate 11 are received in the channels of the strips forming the frame for said plate and packing means shown at 14 is, preferably, received within said channels over the edges of the plate for preventing rattling of the latter in its frame.

Rods 15, preferably, extend the length of the upper and lower channel strips of the frame for plate 11, said rods being received in the channel strips beyond the edges of plate 11 and packing 14. Pivot pins 16 extend from the respective rods 15 outwardly through the frame for plate 11 in the plane of the plate forming the wind deflector. These pivot pins are arranged transversely of the wind deflector at the points where it is desired to form the pivot for the wind deflector and are each received within a bearing lug 17, said bearing lugs being arranged to be clamped to cross bars 10. The bearings for pins 16 in lugs 17 are, preferably, ground joints comprising tapering bearing pins and co-operating tapering bearings, the bearing pins being, preferably, held within their bearing lugs by nuts 18. By this arrangement it will be seen that the wind deflector may be pivotally adjusted with relation to bearing lugs 17, the wind deflector being held in adjusted positions against vibration by the ground joints provided between pins 16 and their bearings formed in lugs 17. The bearing lugs 17 are shown as formed with clips 20 arranged to be received over the respective cross bars 10, and said bearing lugs are detachably held in position with relation to said cross bars by bolts 21 projecting from clips 20 through suitable apertures 22 provided in the cross bars, the usual retaining nuts 23 being provided upon the ends of said bolts.

By the construction as thus set forth it will be seen that I have provided means whereby wind deflectors to be mounted at the sides of a usual windshield may be pivotally adjusted relative to the main windshield, said wind deflectors being firmly supported in frames extending from the sides of the windshield and positively connected to the frame of the top of the motor vehicle so as to prevent vibration of said frames.

Various changes may be made without departing from the spirit of the invention as claimed.

What is claimed is:

1. The combination with a windshield, of supporting means extending from said windshield, a frame, a wind deflector received in said frame, rods extending along the upper and lower ends of said frame, pivot pins projecting from said rods beyond the upper and lower edges of said deflector intermediate of its side edges, bearing lugs comprising a bearing portion adapted to receive said pins, a U-shaped clamping member projecting forwardly from said bearing portion, and adapted to fit said supports, a stud in said U-shaped member adapted to hold said clamping member to said supports.

2. The combination with a motor vehicle having a windshield and a top extending over the edge of said windshield and extending laterally beyond the same, of supporting bars extending laterally from the sides of said windshield and connected at their outer ends to a bar connected to said top, a wind deflector, and pivotal connections extending beyond the upper and lower edges of said deflector and engaging said supporting bars to provide a pivotally adjustable support for said wind deflector.

3. The combination with a main windshield having a side upright and a top extending beyond the side of the main windshield, of a lower supporting rod extending from the side upright, a second upright connecting the outer end of the supporting rod to the outer side of the top, cross bars connecting the uprights, and a wind deflector pivotally connected to the cross bars at points intermediate of its sides.

In testimony whereof I have signed my name to this specification.

JOSEPH P. GRAY.